United States Patent Office 3,497,225
Patented Feb. 24, 1970

3,497,225
DYNAMIC SEAL HAVING STATIC
SEALING ELEMENT
Woodrow Irwin Workman, Laconia, N.H., assignor to
International Packings Corporation, Bristol, N.H., a
corporation of New Hampshire
Filed Sept. 26, 1967, Ser. No. 670,531
Int. Cl. F16j 15/32, 15/02
U.S. Cl. 277—134                                    6 Claims

ABSTRACT OF THE DISCLOSURE

Sealing the axial flow of fluid along a rotatable shaft when the shaft is stationary and when it is rotating by use of both a dynamic sealing element shaped to pump fluid axially when the shaft rotates and static elements which limit the fluid flow when the shaft is stationary. Static element friction is reduced during shaft rotation by the dynamic element pumping.

This invention relates to fluid seals and more particularly to a flexible sealing means adapted to prevent the escape or leakage of oil or other fluid axially along the surface of a rotatable cylindrical shaft.

A variety of forces act upon fluid lubricants to cause outward leakage from the journal, bearing, or other shaft-supporting member. While the shaft is rotating various pumping or splashing forces may cause fluid to be expelled outward along the shaft. Even while the shaft is at rest, cohesive and capillary forces acting between the fluid and the shaft may cause a film of fluid to creep outward along the surface of the shaft. A relatively fluid-tight seal can be effected by force, for example by binding the sealing member tightly to the shaft with ring clamps, garter bands, or other analogous structures that exert a strong pressure directed radially inward toward the axis of the shaft. Such forced seals have a number of serious limitations. First, the resulting pressure of the sealing member rubbing against the moving shaft wastefully increases the frictional load that must be overcome to rotate the shaft. The increase in friction not only wastes power, but also causes heating of the seal resulting in undesirable dimensional changes and changes in the modulus of elasticity. Second, the same rubbing pressure carries with it the further disadvantage of increasing the amount of wear to which the sealing member is subject. Abraded particles of the seal may introduce a harmful contaminant to the fluid reservoir inward of the seal. Added wear also necessitates frequent and costly replacement of worn seals and such replacement is made more difficult because of the need to loosen or even remove the clamp, band or other pressure producing structure prior to removal of the seal. Finally, forced seals make no adaptation for the very different sealing requirements which exist while the shaft is stationary and while the shaft is rotating.

Accordingly, it is the primary object of the present invention to provide an improved static-dynamic fluid seal for preventing the axial leakage of oil or other fluids along the surface of a rotatable cylindrical shaft both while the shaft is rotating and while it is stationary. Another object of the invention is to provide a seal which offers a minimum of frictional resistance to relative axial or radial movement between the shaft and the seal. Consequently, the seal is subject to very little wear and it continues to prevent virtually all leakage of fluid even after thousands of hours of operation. A final object of the invention is to provide such a seal by means of a compact, integral, lightweight, relatively inexpensive structure.

A preferred embodiment features three annular sealing elements of elastomeric material which together perform a multiple sealing function such that efficient dynamic sealing is available while the shaft is rotating and efficient static sealing comes into play while the shaft is at rest. While the shaft is rotating, the sealing elements are not forced into contact with the shaft, but on the contrary, are, because of the special configuration of one of the sealing elements caused to "float" upon a thin film of fluid which is never permitted to escape from the seal but is instead continually returned to the fluid reservoir inward of the seal by a controlled pumping action. While the shaft is at rest, the pumping action ceases, and the natural resilience of the elastomeric material biases the two other sealing elements into contact with the shaft around its entire circumference, thereby providing a positive static seal against leakage of fluid while the shaft is at rest.

Other objects, features, and advantages of the present invention will appear from the following description of a preferred embodiment of the invention taken together with the attached drawings thereof, in which:

FIG. 1 is a perspective view of the entire seal of the invention.

FIG. 2 is an expanded sectional view of the operative portion of the seal that cooperates with the shaft. The section is taken on a plane through the axis of the shaft and the seal is shown in the position it would assume when the shaft is at rest. The radial dimension is exaggerated for clarity.

Figure 1:
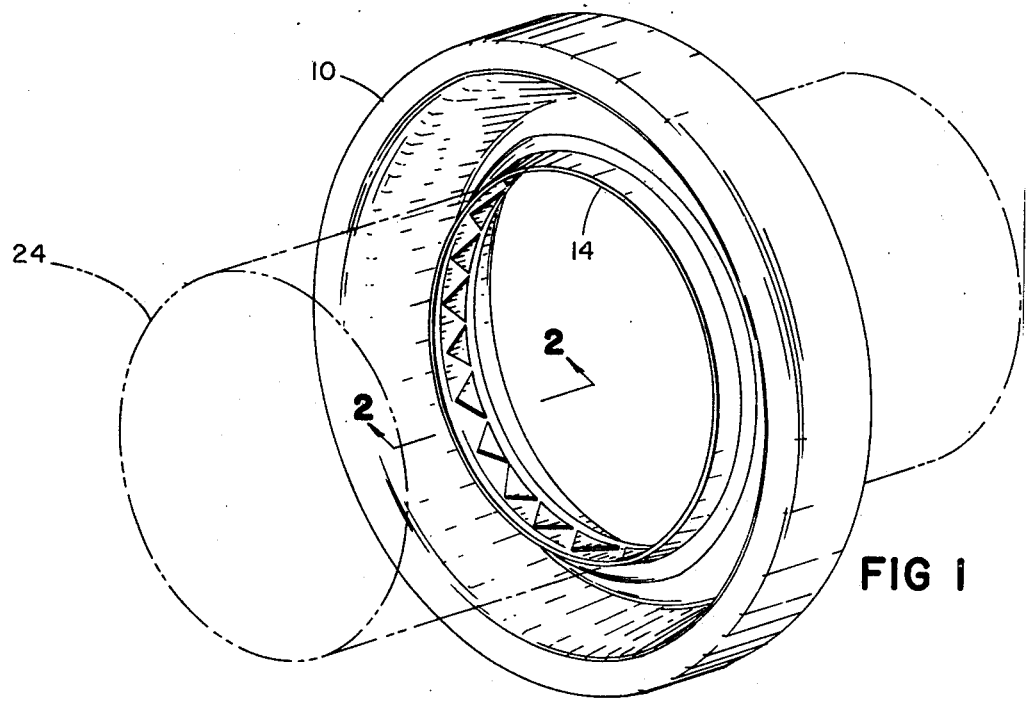

In FIG. 1 is shown a perspective view from the inner (fluid reservoir) side of the seal. The seal includes a rigid metal case of annular shape 10. The outer periphery of this case is preferably covered with a layer of elastomeric material which prevents leakage of the fluid around the exterior of the seal case and permits mounting the seal by an interference fit in a cooperating bore in the journal box or other fluid reservoir from which the shaft emerges. The operative portion of the seal is a uniquely shaped annular molding of elastomeric material 14 that is bonded to the rigid inner flange of the case 10 and extends axially therefrom concentric to shaft 24.

Figure 2:
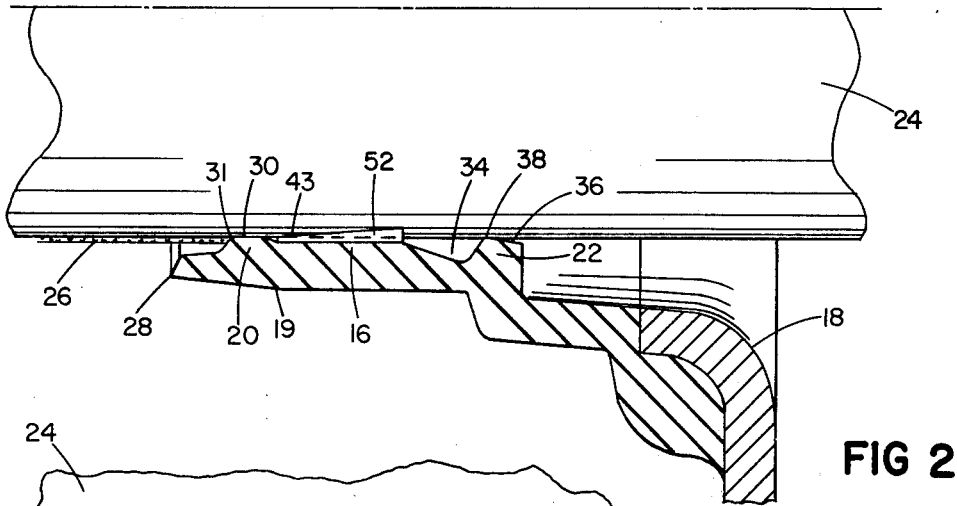

The principal components of this annular molding are best seen in FIG. 2. The radial dimension is exaggerated for clarity. In general, it includes a dynamic sealing element generally designated 16 axially spaced from rigid flange 18 for limited radial movement relative thereto, an inner static sealing element generally designated 20 further spaced from rigid flange 18 for somewhat greater radial movement relative thereto, and preferably an outer static and dynamic sealing element generally designated 22, between flange 18 and dynamic sealing element 16. It is these portions of the seal which cooperate with the shaft 24 to prevent the escape or leakage of fluid.

In FIG. 2 the seal is shown in the position it would occupy with the shaft 24 at rest. The left end of the shaft 24 as shown in FIG. 2 is on the inner side of the seal, and may be immersed in a fluid reservoir so that at least a film of fluid 26 will normally be present on the surface of the shaft at that end. With the shaft at rest, the inner static sealing element 20 serves as a barrier to the flow of fluid to axially outside points (i.e. points further to the right). This inner sealing element is biased into relatively firm contact with the shaft over a cylindrical surface 30 extending completely around the circumference of the shaft; the force so biasing sealing element 20 is the natural elasticity of the elastomeric material of which the seal is constructed.

In its relaxed state, sealing element 20 is of slightly smaller diameter than shaft 24. Cantilever rim 28 is the inner edge of the seal molding. It is trimmed to leave a small margin or flashing of elastomeric material at the inner (left) side of sealing element 20. The natural elasticity of rim 28 also contributes to biasing the sealing element 20 against the shaft. To the outside of the inner static sealing element 20 is the central dynamic sealing element 16. When shaft 24 rotates, dynamic sealing element 16 causes oil to be pumped axially inward along passage 37 (shown in FIG. 6) past the inner seal 20 in a manner to be later described.

To the outside of central dynamic sealing element 16 is an annular groove 34 and outside that groove is the outer static and dynamic sealing element 22. Sealing element 22 has an outwardly inclined inner surface 36 which meets shaft 24 at a relatively sharp dam-like edge 38. This edge extends entirely around the circumference of the shaft and is biased against the surface of the shaft by the elasticity of the seal material. Sealing element 22 acts as a static seal when shaft 24 is at rest, and as a dynamic seal when shaft 24 is rotating; it seals in both inward and outward directions axially along the shaft, retaining oil inside edge 38 and dirt outside edge 38.

Figure 3:
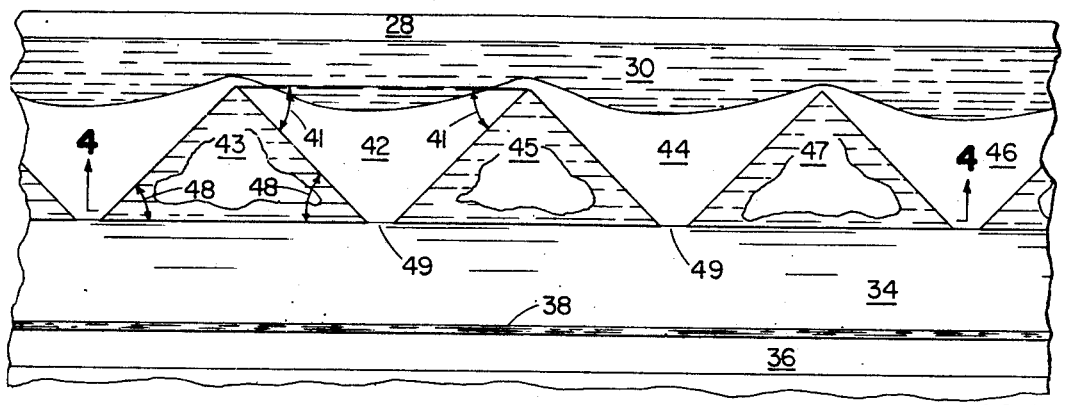
FIG. 3 is an expanded view of the sealing elements of FIG. 2 developed from a cylindrical surface to a flat plane, the view being taken from the direction of the shaft axis.
Figure 4:
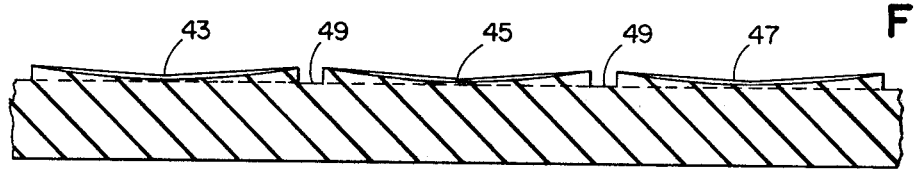
FIG. 4 is a similarly developed sectional view of the central dynamic sealing element taken at 4—4 of FIG. 3 along the direction of the shaft axis.
Figure 5:
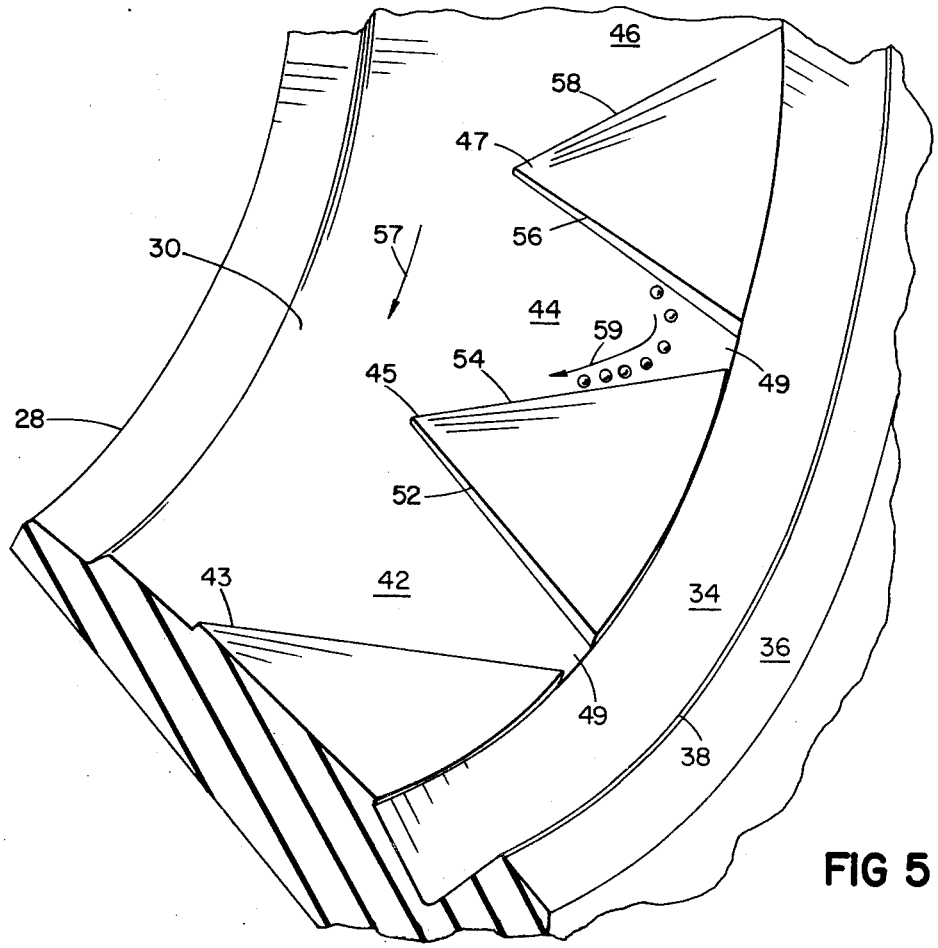
FIG. 5 is a perspective view of the operative portion of the seal curved in the proper position for cooperation with the shaft.

FIGURES 3, 4, and 5 show the details of the inner surface of the central dynamic sealing element 16. The inner surface of this element is shown in FIG. 3 viewed from the shaft axis radially outwards. The same surface is shown viewed axially inwards in a direction parallel to the shaft axis in FIG. 4. For the sake of clarity, in both FIG. 3 and FIG. 4 the dynamic sealing element 16 is shown projected into a flat plane rather than curved to conform to the cylindrical surface of shaft 24. In FIG. 5, the dynamic sealing element 16 is shown in perspective to illustrate the manner in which it cooperates with the curved surface of shaft 24.

As may best be seen in FIG. 3 and FIG. 4, the dynamic sealing element 16 has a continuous inner surface upon which are embossed lands formed in the shape of isosceles triangles with base angles 48 of about 35 degrees. These triangular lands are relatively shallow, for example of 0.003 inch thickness at the base and 0.0015 inch thickness at the apex. Between the lands 43, 45, and 47 are equally shallow grooves or indentations 42, 44, and 46. These grooves are formed in the shape of isosceles trapezoids with base angles 41 of about 35 degrees. They extend axially completely across dynamic sealing element 16. The shaded areas of FIG. 3 represent typical patterns of contact observed betwen the shaft and the seal when the shaft is at rest as in FIG. 2. With the sealing element lands in contact with the shaft 24, the grooves between the lands and the surface of the shaft cooperate to form passages having their narrowest but deepest portion 49 on the axially outward side of dynamic sealing element 16. The surfaces of the grooves or indentations are all located upon the same generally cylindrical surface concentric with the surface of shaft 24 and radially slightly outside the surface of the shaft. (Because of the slight taper in the depth of the lands, the surface is not perfectly cylindrical, but is rather slightly conical. As may be best seen in FIG. 2 and FIG. 5, the grooves are shallowest at the axially inner edge of sealing element 16, and deepest at the axially outer edge.)

The base width of the lands 43 and 45 may be small compared with the circumference of shaft 24 so that sealing element 16 can contain a large number of lands. In the preferred embodiment, there are 20 such lands, although this specific number is in no way critical. The base angle of the lands may likewise be varied, but any great deviation from the 35° angle used in the embodiment described may reduce the pumping rate of the dynamic sealing element 16.

As may be seen in FIG. 4, the inner surface of each land is cylindrically curved in the direction of shaft curvature but with a somewhat greater degree of curvature than that of the shaft surface. The inner side edges of the lands (edges 52 and 54 for land 45 and edges 56 and 58 for land 47) are the principal portions of the lands that are actually in contact with the surface of the shaft. This edge contact ensures that the actual lines of contact remain sharp and well defined over a long period of operation. Even if some moderate amount of wear of the land should occur over time, the natural resilience of the elastomeric material of the seal keeps a sharp edge contact with the shaft. Although the specific configuration of dynamic seal 16 shown in FIGS. 3, 4, and 5 has proven to be convenient to manufacture and very efficient in operation, it is by no means the only configuration that will produce the required result. Of importance are the following two requirements: (1) that there be open passages extending completely across the dynamic sealing element 16; and (2) that the lines of contact between that element and the surface of shaft 24 should define acute angles with lines on the surface of the shaft parallel to the axis of the shaft. Various alternate embodiments satisfying these criteria have been tried and have proven moderately effective atlhough the preferred embodiment shown is the most satisfactory yet produced.

In operation, the seal utilizes the inner static sealing element 20, the central dynamic sealing element 16, and the outer static and dynamic sealing element 22. Initially, when the shaft is at rest, the inner static sealing element 20 serves to limit the outward flow of fluid film 26. The relatively large cylindrical inner surface 30 of inner static sealing element 20 is in firm contact with the surface of shaft 24 around the entire circumference of the shaft. Even if the entire fluid reservoir on the inner side of inner static sealing element 20 is full of pressurized fluid, a good seal would still be provided because the axially outward pressure would be offset by a proportionate inwardly directed radial pressure on the entire seal surface 19 and that inwardly directed radial pressure would tend to produce an even firmer contact between surface 30 of inner static sealing element 20 and the surface of shaft 24.

Figure 6:
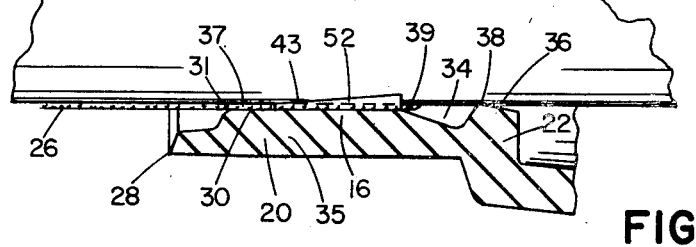
FIG. 6 is an expanded sectional view similar to that of FIG. 2 but showing the seal in the deformed position that it would assume when the shaft is rotating.

When the shaft is rotated, a different mode of sealing, dynamic sealing comes into play. This dynamic sealing depends primarily upon an inward pumping action of the central dynamic sealing element 16. When the seal is first used, inner static sealing element 20 may be relatively dry. The inner surface 30 of element 20 tends to adhere to the surface of shaft 24 and to "grab" as the shaft is first rotated. This creates a slight buckling of static sealing element 20 which permits a small amount of fluid to penetrate between the shaft 24 and sealing surface 30, and thereby to flow through axially outward toward the central dynamic sealing element 16. Once the sealing surface 30 is wetted with fluid and sufficiently lubricated there is no further tendency to grab until such time as it may again become dry. However, the centrifugal motion imparted to the fluid by shaft rotation impels the fluid against the inner radius 31 of sealing element 20 and also against the inner surface of rim 28 and thereby lifts element 20 free of the shaft surface as shown in FIG. 6. This bending of the seal radially outward from the surface of shaft 24 creates a passage 37 between the inner fluid reservoir and central dynamic sealing element 16. A film of fluid can thus enter the passages between the surface of shaft 24 and the grooves between the lands of dynamic sealing element 16.

This film of fluid is pumped back in an axially inward direction 59 as shown in FIG. 5. When the shaft is rotated in the direction shown by arrow 57, the film of fluid cohering to the surface of shaft 24 is thrown against the pumping edge 54 of land 45 and is thereby expelled axially inward in the general direction of arrow 59. If the shaft 24 is rotated in the opposite direction, the fluid is still expelled axially inward in the same direction as before, but the pumping edge is then edge 56 rather than edge 54. Fluid thus flows outward through passage 37 until arrested by the inward pumping action of dynamic sealing element 16. At any given rate of shaft rotation, the film of fluid between the seal and the shaft reaches a dynamic equilibrium between the outward pressure from the fluid reservoir and the inward pumping pressure of dynamic sealing element 16.

The radially outward deformation of inner static sealing element 20 ensure that while the shaft rotates, the inner surface 30 of that element is no longer in firm contact with the surface of shaft 24. The separation between inner surface 30 and the shaft 24 virtually eliminates friction between the shaft and sealing element 20 as well as wear of sealing element 20.

Dynamic sealing element 16 is lubricated by the film of fluid that penetrates into the grooves between the lands on its inner surface, and the wiping contact edges of the lands tend to ride on the inner portion of that film. If the cohesive forces between the fluid and the surface of shaft 24 are particularly strong, some small amount of fluid may flow outward between the lands of dynamic sealing element 16 into annular groove 34 as shown in FIG. 6 at 39. However, the pumping action of dynamic sealing element 16 tends to propel such fluid back inward through passage 37 so very little fluid will remain in annular groove 34 when the shaft ceases to rotate. Any fluid so remaining is confined within the seal by edge 38 of outer static and dynamic sealing element 22.

While the shaft is rotating, it seems probable that the pumping action of dynamic sealing element 16 would produce a relatively low pressure zone in annular groove 34. If the pressure in this groove should drop to a value appreciably lower than the normal atmospheric pressure acting on the outwardly inclined inner surface 36 of outer static and dynamic sealing element 22, there would be a further advantage of the seal configuration shown; the atmospheric pressure acting on surface 36 when the shaft 24 is rotating would then tend to reduce the force with which edge 38 is biased against shaft 24, thereby decreasing the friction between that edge and the shaft.

When shaft rotation ceases, the pumping action of dynamic sealing element 16 also ceases. Edge 38 of outer static and dynamic sealing element 22 then presses firmly against the surface of shaft 24 thus preventing the escape of any residual film of fluid that may be left in annular groove 34. Inner static sealing element 20, in the absence of any pumping pressure on surface 30, returns to its normal position as shown in FIG. 2 with its inner surface 30 sealing firmly against the surface of shaft 24.

It can thus be seen that the present invention has by reason of its unique configuration of sealing elements provided a superior means for limiting the flow of fluids to a predetermined point on a rotatable cylindrical shaft both while the shaft is rotating and while it is stationary.

Other embodiments will occur to those skilled in the art and are within the following claims.

What is claimed is:

1. A fluid seal for limiting axial flow along the surface of a rotatable cylindrical shaft comprising:
    at least one static annular sealing element having an inner surface adapted to meet a rotatable cylindrical shaft in sealing contact therewith around the entire circumference of said shaft,
    a dynamic annular sealing element axially spaced from said static element and having a generally cylindrical inner surface divided into two portions, a first portion adapted for sealing contact with the surface of said shaft and a second portion spaced radially outward from said first portion,
    said first and second portions being interconnected by radially extending pumping surfaces with inner edges adapted for sealing contact with the surface of said shaft, said inner edges oriented at acute angles to the axis of said shaft,
    said second portion and said radially extending pumping surfaces defining a plurality of axial passages extending axially across the entire width of said dynamic sealing element through which fluid may pass when said shaft is at rest,
    whereby when said shaft rotates fluid is pumped axially inward through said passages and is thereby returned to a fluid reservoir and prevented from escaping outward past a predetermined circle defining a plane normal to the axis of said shaft on the surface of said shaft,
    said pumping being produced by the motion of the rotating shaft and the layers of fluid adjacent thereto and cohesive therewith relative to said pumping surfaces.

2. The fluid seal of claim 1 wherein said static annular sealing element is deformable between a first position when said shaft is at rest wherein the inner surface of said static element is in sealing contact with said shaft around the entire circumference of said shaft and other positions when the shaft is rotating wherein the inner surface of said static annular sealing element is spaced from the surface of said shaft.

3. The fluid seal of claim 1 wherein said static annular sealing element is adjacent to and extends axially inward from said dynamic annular sealing element, a portion of the surface of said static sealing element is spaced from the surface of said shaft and non-perpendicular to the surface of said shaft, and said static sealing element is adapted for limited radial motion outward from the surface of said shaft,
    whereby the centrifugal pressure of fluid impelled radially outward from the surface of said shaft when said shaft is rotated acts against the radially inward surfaces of said static annular sealing element causing it to be deformed radially outward and to be thereby separated from the surface of said shaft.

4. The fluid seal of claim 1 further comprising at least one static and dynamic sealing element axially spaced from said dynamic annular sealing element
    said static and dynamic sealing element having an inner surface deformable between a first position when said shaft is at rest wherein a portion of said inner surface is in firm sealing contact with said shaft and other positions when said shaft is rotating wherein said portion of said inner surface is in light sliding contact with the surface of said shaft.

5. The fluid seal of claim 1 wherein the inner surface of said dynamic annular sealing element is embossed with a plurality of alternating grooves and lands
    said lands having an inner surface with a curvature in the direction of and greater than the curvature of said shaft
    said lands being adapted for sealing contact with said shaft along zones contiguous with the sides of said lands.

6. A fluid seal for limiting axial flow along the surface of a rotatable cylindrical shaft
    said seal comprising a metal case of generally annular shape having affixed to the inner edge of said case an elastomeric sealing member of generally annular shape extending axially inward in the direction of the fluid reservoir or other fluid the flow of which is to be limited
    said elastomeric sealing member comprising a flexible supporting surface cantilevered axially inward in the direction of the fluid reservoir or other fluid source the axially outward flow from which is to be limited by said fluid seal said supporting surface being deformable radially outward from its axis and having on its inner surface the following elements in order from the outside of the sealing member axially inward.

an outer annular static and dynamic sealing element having an inner surface concentric with said shaft and inclined outwardly at an acute angle to the axis of said shaft the axially outer portion of said inner surface being spaced from the surface of said shaft and the axially inner portion of said inner surface being adapted to cooperate with said shaft in firm sealing contact around the entire circumference of said shaft when said shaft is at rest a central annular dynamic sealing element having a generally cylindrical inner surface embossed with a plurality of alternating grooves and lands said grooves extending axially across the entire width of said dynamic annular sealing element and said lands being formed in the shape of isosceles triangles with apexes oriented toward the axially inner side of said dynamic sealing element and with sides having directions at acute angles to the direction of the axis of said shaft, said lands having an inner surface with a curvature in the direction of and greater than the curvature of said shaft and being adapted for sealing contact with said shaft along relatively narrow zones contiguous with the sides of said lands, said lands being of tapered thickness being thickest at the bases and thinnest at the apexes an inner annular static sealing element having a generally cylindrical inner surface adapted to meet said shaft in sealing contact therewith around the entire circumference of said shaft, said inner annular static sealing element being deformable between a first position when said shaft is at rest wherein the inner surface of said inner annular static sealing element is in sealing contact with said shaft around the entire circumference of said shaft and at least one second position when the shaft is rotating wherein the inner surface of said inner annular static sealing element is spaced from the surface of said shaft.

References Cited

UNITED STATES PATENTS 2,958,551  11/1960  Rogers _____ 277—134 X

FOREIGN PATENTS 1,468,256  12/1966  France.

OTHER REFERENCES

Zero Leakage, by R. L. Dega, paper No. 67, WA/LUB–11, p. 12, July 18, 1967.

SAMUEL ROTHBERG, Primary Examiner

U.S. Cl. X.R.

134—67